(12) United States Patent
Lee (10) Patent No.: US 7,392,283 B2
(45) Date of Patent: *Jun. 24, 2008

(54) METHOD AND SYSTEM FOR SUPPLYING PRODUCTS FROM PRE-STORED DIGITAL DATA IN RESPONSE TO DEMANDS TRANSMITTED VIA COMPUTER NETWORK

(76) Inventor: Sungil Lee, 606 N. First St., San Jose, CA (US) 95112

( * ) Notice: Subject to any disclaimer, the term of this patent is extended or adjusted under 35 U.S.C. 154(b) by 0 days.

This patent is subject to a terminal disclaimer.

(21) Appl. No.: 11/653,150

(22) Filed: Jan. 11, 2007

(65) Prior Publication Data

US 2007/0180054 A1 Aug. 2, 2007

(51) Int. Cl.
*G06F 15/16* (2006.01)
(52) U.S. Cl. .................. 709/203; 709/217; 709/219
(58) Field of Classification Search ............. 369/84–85; 709/200–203, 217–227
See application file for complete search history.

(56) References Cited

U.S. PATENT DOCUMENTS

| | | | |
|---|---|---|---|
| 6,208,612 B1 * | 3/2001 | Miller | 369/30.19 |
| 7,174,362 B1 * | 2/2007 | Lee | 709/203 |
| 7,277,903 B2 * | 10/2007 | Petrocelli | 707/204 |

* cited by examiner

*Primary Examiner*—Moustafa M Meky
(74) *Attorney, Agent, or Firm*—Jeffrey Sonnabend; SonnabendLaw (57) ABSTRACT

The present invention relates to a digital data duplication system that utilizes one or more computer networks to automate the process from order-taking to delivery, eliminating the need for human supervision. Customers enter requests for a given number of machine-readable articles containing digital data, typically compact disks. The requests are transferred to a website, which sends to a server electronic mails containing the details of the requests. Upon receiving an electronic mail, the server directs a printing device to produce mailing labels for shipment. The server has an internal archive of all data it uses to convert blank CD-Rs into the requested CDs, and is connected to a series of CD-R writing machines. The server schedules each request, downloads necessary data onto the CD-R writing machine that is assigned a particular request, and sends a write command. The CD-R writing machine subsequently transfers the data in its cache onto the pre-loaded CD-Rs. After the data transfer is complete, the CDs embodying the requested information are automatically placed in a bin for shipment.

14 Claims, 4 Drawing Sheets

METHOD AND SYSTEM FOR SUPPLYING PRODUCTS FROM PRE-STORED DIGITAL DATA IN RESPONSE TO DEMANDS TRANSMITTED VIA COMPUTER NETWORK

BACKGROUND OF THE INVENTION

1. Technical Field

The present invention relates to a digital data duplication system that utilizes one or more computer networks to automate the process from order-taking to product delivery. More specifically, the invention permits users of CD duplication services to directly place requests into a server, which then schedules production, allocates resources, executes duplication, and sorts the products for shipment.

2. Description of Related Art

Before the advent of recordable digital compact disks (hereinafter "CD-Rs"), the transfer of data onto compact digital disks was a costly procedure, economically feasible only when manufacturing a large number of copies. Users whose applications required relatively few copies or required frequent data updates could not reap the benefits of this compact disk duplication technology, even though low-cost disk-readers were readily available.

The advent of CD-R was intended to allow users to record their own disks and thereby achieve significant savings. Unlike a common compact disk that has been pressed by a mold, a CD-R typically has a dye layer that is etched by a laser contained in the C-AR disk drive. Once etched, the "burned" CD-R disk is unalterable.

Several practical problems have prevented CD-R users from attaining maximal efficiency in the copy process, especially when attempting to make multiple disk copies in a short amount of time. One of the problems that typically arise in a volume copying process using CD-R writers is the necessity for direct human supervision. A person has to prepare CD-R disks for copying, remove the disks from the CD-R writer once copying is complete, and then prepare the disks for inspection to ensure no defective CD-R disks are retained in the completed set of copies. Aside from the tedium involved that may increase errors, requiring human attention in this process adds a significant labor cost that is added to the end-user price.

One solution to the human supervision problem is a programmable, automatic compact disc duplication system. That system, which includes a copy unit, a host computer and a computer software that provides a user interface, is further discussed in U.S. Pat. No. 6,141,298, incorporated herein by reference. While the system in the above patent eliminates some of the manual steps that creates inefficiency, it still leaves many steps to be handled by operators.

SUMMARY

The present invention relates to a method and system of taking customer requests and writing the requested digital data onto various digital recording media, such as CD-ROMs, CDs, mini-CDs, or DVDs. Using this method, a customer can request any quantity of a specific CD, mini-CD, or DVD through an electronic commerce transaction system or a website and have a server automatically process the request so that it is ready for delivery. Upon order entry, the customer interface website first sends an electronic mail (e-mail) to a CD Writer Server. The e-mail triggers the CD Writer Server to update a log of requests and send signals to one or more printing devices that prepare address labels for delivery. Once the log is updated, the CD Writer Server schedules the requests based on estimated process time, availability of the appropriate output device, suitability of particular devices for handling a particular request, among other characteristics. Information on process time is obtained from an internal archive of the digital data used to produce the ordered CDs. Likewise, the information concerning the availability of each output device in the system is found in internal resource files. When scheduling is complete, the CD Writer Server converts the e-mail requests into machine language and sends write commands to designated output devices.

One important object of the present invention is to cost-effectively duplicate CDs using CD writers in response to requests received from remote customers. The present invention removes the inefficiency associated with human supervision, and eliminates the need for inventory.

As will be readily understood by one of ordinary skill in the art, any available recording media can be used in place of CD disks, DVD disks and like media. Other such media types include but are not limited to HDVD disks, Blu-Ray disks, non-volatile computer memory, flash memory, NAND gate memory, hard disk drives and floppy disk drives. Likewise, microprocessor based devices such as "palm-top" computers, "laptop" computers and the like may function as media in the instant invention.

In addition to the requested content, the system of the present invention may transfer to the receiving media additional information or data. For example, such additional information or data may include, among others, serial numbers, creation dates, copyright and other rights notices, owner information, service provider information, advertisement information, digital rights management information and the like. Any information which can be encoded in digital format and transferred to the receiving media may be included in the additional information or data.

One of ordinary skill in the art will readily understand that "blank" as used herein need not be limited to fully blank or wholly blank media; instead, any media with sufficient capacity to receive the requested content or other data will suffice, regardless of whether such media requires pre-existing data to be erased prior to transfer of the new data and regardless of whether such media will receive the new data in "free" portions, i.e., "blank" portions, of the media.

DETAILED DESCRIPTION

Figure 1:
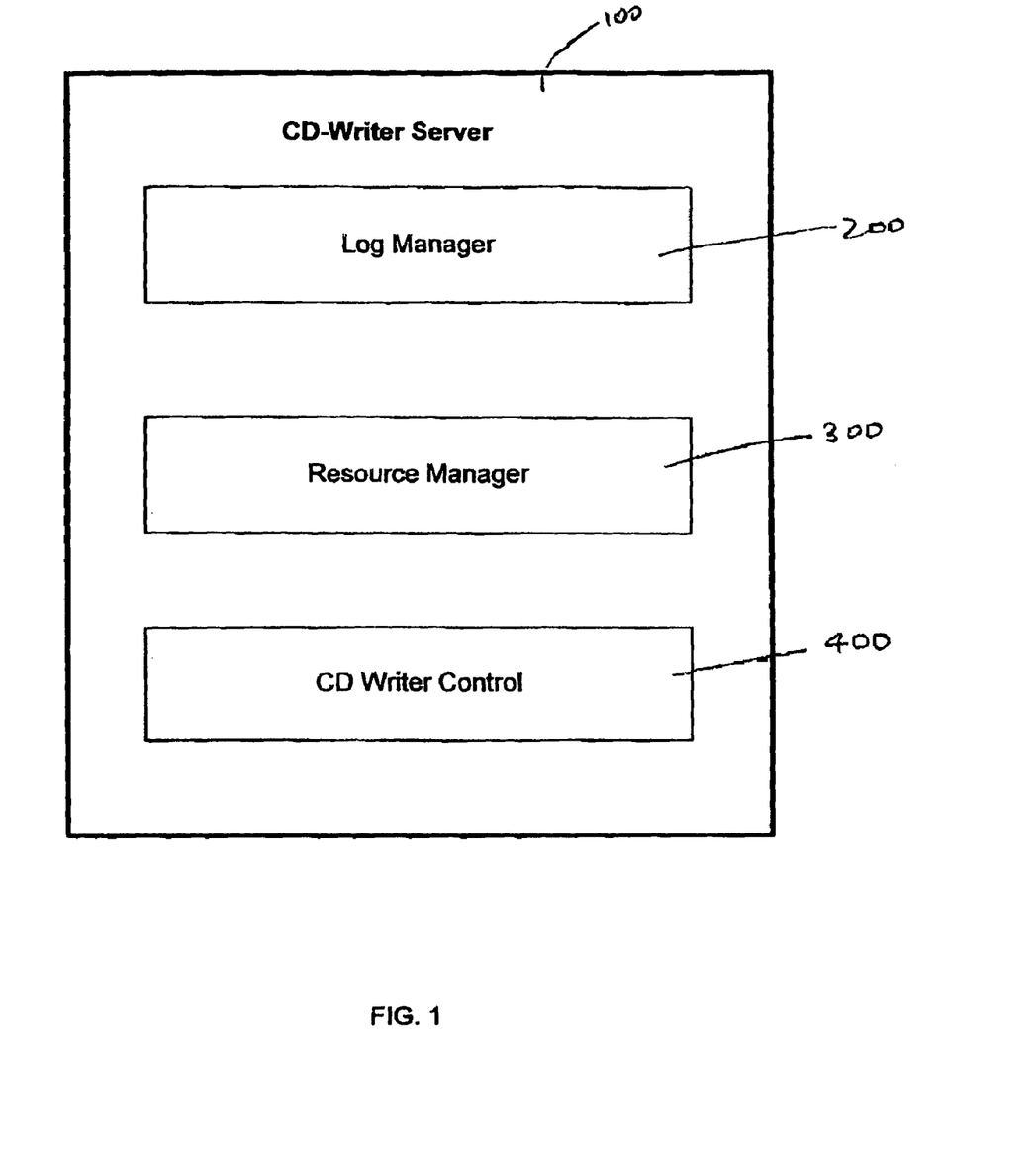
FIG. 1 is a schematic depiction of the three modules comprising a CD Writer Server.

The present method and system relate to conducting a business that supplies any type of written or printed material, such as invitations, books, cards, and similar materials that can be mechanically produced from an archive of digital information. In one embodiment, the present invention is adapted to produce various digital recording media, such as CD-ROMs, CDs, mini-CDs, and DVDs (hereinafter collectively referred to as CDs). The invention is implemented through a computer system herein referred to as CD Writer Server. CD Writer Server 100 processes customer requests by using three modules that work together: Log Manager 200, Resource Manager 300, and CD Writer Control 400 (see FIG. 1). A "module," as used herein, refers to the functionality and not the configuration of components.

The CD Writer Server 100 typically resides on an e-mail server because the CD Writer Server commonly communicates with the customer interface 10 via e-mails. The order fulfillment process is triggered when a customer enters a request through a customer interface 10. A customer interface includes but is not limited to a website, a web server, an electronic commerce transaction system, a customized start page, or an e-mail subsystem. At the interface, the customer is prompted to provide 1) the content(s) he wants duplicated, for example identifiers of songs, movies, or software, 2) the desired quantity, 3) personal information such as the name, address, and phone number of the customer, 4) the desired shipping method, 5) the due date, and 6) a payment or a method of payment, such as a credit card number, among other information. After the request has been entered and the CD Writer Server 100 has scheduled the request, the customer may be able to see an estimated delivery date at the interface 10.

The present system manages payment at the customer interface 10, either through an e-commerce transaction system involving a credit card number, or through an account number to which charges can be made. Managing payment through an e-commerce system significantly reduces the amount of human supervision that is required.

Figure 2:
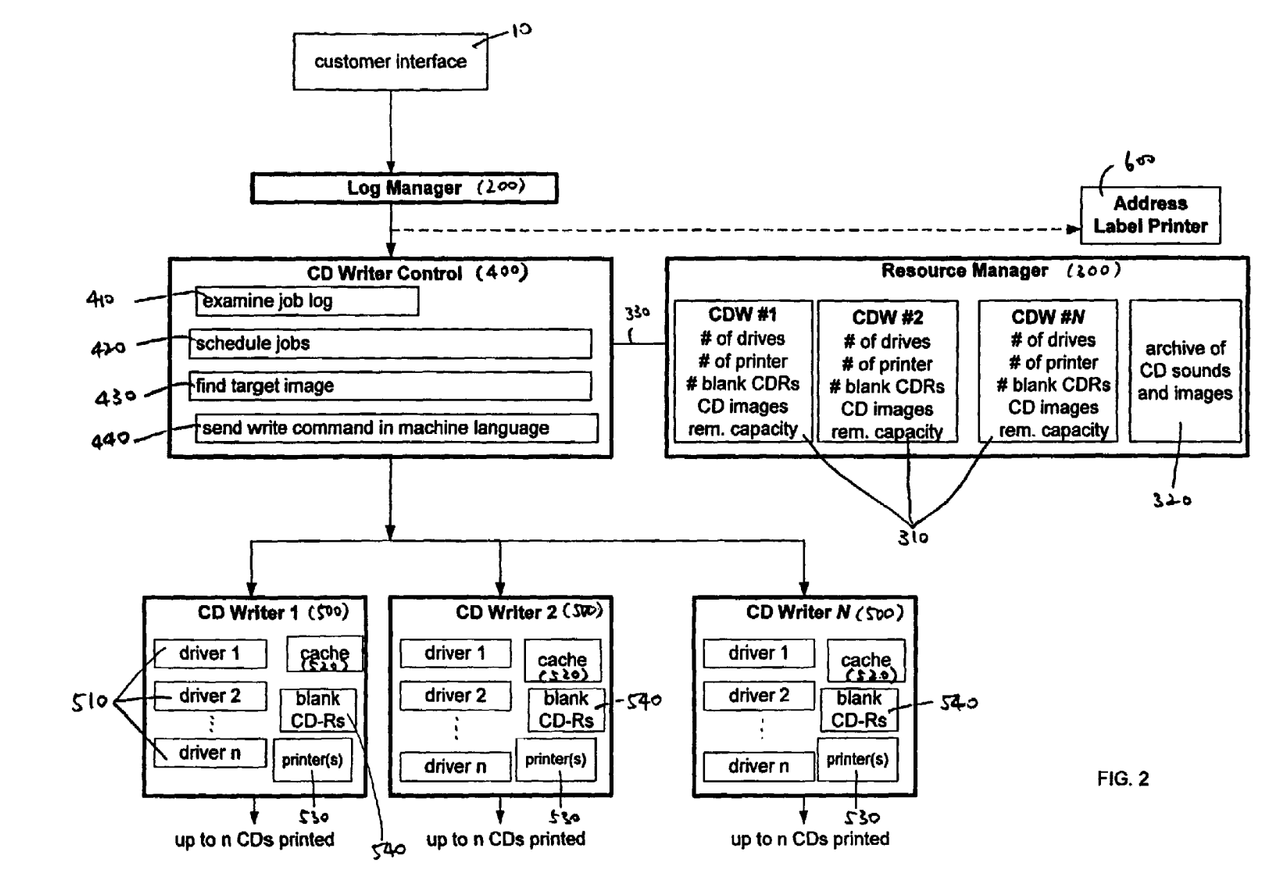
FIG. 2 is a block diagram depicting the process flow from order receipt to production.
Figure 3:
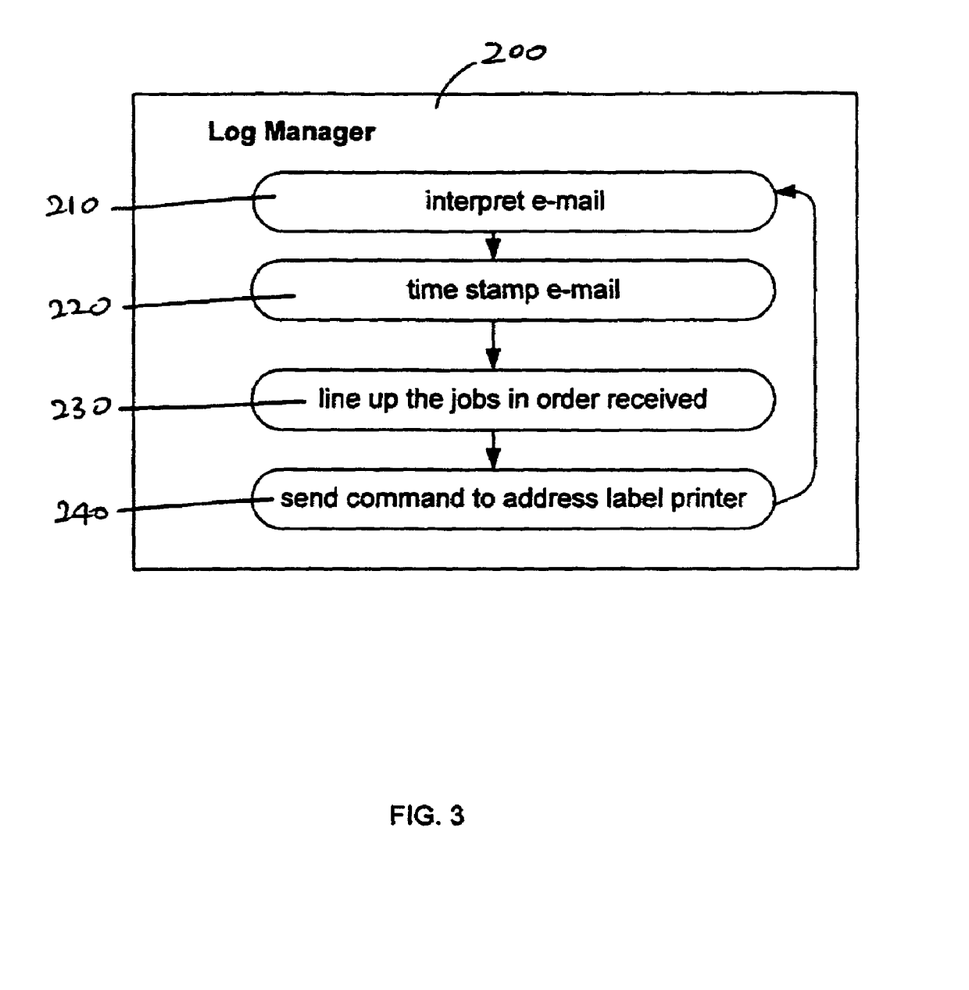
FIG. 3 is a schematic depiction of the functions of the Log Manager.

As shown in FIG. 2, the CD Writer Server 100 module that first receives an e-mail order from the customer interface is Log Manager 200. FIG. 3 shows that upon receiving an e-mail, Log Manager 200 first interprets it 210 and extracts certain information, including but not limited to the mailing address. Then, Log Manager 200 time-stamps each incoming e-mail 220 and lines it up in the order of receipt 230, creating a log that CD Writer Control 400 can eventually retrieve and process. In addition, Log Manager 200 sends the extracted mailing address information 240 to an address label printer 600. The printer 600 is optionally attached to the CD Writer Server 100. Log Manager 200 repeats 250 the process with each incoming e-mail request, updating the log with each request.

After Log Manager updates the log, CD Writer Control 400 retrieves the log and examines it 410 in conjunction with the information stored in Resource Manager to schedule the production of CDs. The information CD Writer Control retrieves from Log Manager 200 pertains to the specifics of a request, such as the order quantity and the requested content. In contrast, the information stored in Resource Manager 300 pertains to hardware configuration and digital data that represent contents that can be transferred to a blank medium. As FIG. 2 shows, Resource Manager maintains two types of files: a set of resource files 310, one file for each of the output devices controlled by CD Writer Server, and an archive 320 of all the sounds, images, and characters used to execute the duplication requests.

In one embodiment, there are as many resource files 310 in Resource Manager 300 as there are output devices (hereinafter CD Writers) 500. For example, Resource Manager 300 shown in FIG. 2 stores N resource files 310 because there are N CD Writers 500. Each resource file contains the name and the IP address of each CD Writer 500, the number of drives and printers in each of those machines, and the number of blank CD-Rs remaining in each machine, among other information. Moreover, the resource file 310 keeps track of which data from its archive 320 has been copied to the internal cache 520 of each CD Writer 500 and how much cache space remains in each machine. The latter information becomes important when some data needs to be purged in order to download new data. As FIG. 2 shows, Resource Manager 300 and CD Writer Control 400 maintain close communication 330 so that every time CD Writer Control 400 sends a write command 440 to one of the CD Writers 500, Resource Manager 300 can update the resource file 310 for that CD Writer.

As mentioned above, Resource Manager 300 also stores an archive 320 of all the sounds, images, and characters used to produce the requested CDs. The archive can be internally indexed by part numbers, each part number being associated with a path name. In one, the hard drive of Resource Manager 300 was designed to hold at least 1,000 CD contents along with corresponding graphics, which are to be physically printed on the CDs (the number of contents the archive can hold depends on the amount of data that each content corresponds to). In order to change or update the contents of the archives an operator would have to delete some of the existing data and download new data from a network or a digital storage medium.

CD Writer Control 400 retrieves information from both Log Manager 200 and Resource Manager 300 to schedule production for each CD Writer 500 connected to the system. In order to optimize production, CD Writer Control 400 must first calculate the process time for each order 412. This calculation is performed by first reading the title of the requested songs or movies from the order log and looking up the size of those songs or movies in the Resource Manager archive. Then, CD Writer Control 400 can schedule the requests according to whatever criteria that best suits the business (i.e., it can be programmed). For example, it can schedule the duplication jobs in the order that the requests were received, to ensure that between two requests with approximately equal process times, the request that was received first will be processed first. Alternatively, it can prioritize the request with a closer due date or an order marked "high priority." Furthermore, if there are multiple orders requesting the same content, CD Writer Control 400 can group those orders so that they can be produced together 414 (but the mailing address labels would be different for each order). Other factors may only be taken into account in the scheduling algorithm.

Since there are different types of CD Writers 500 (for example, CD Writers for DVDs and CD Writers for mini-CDs) with different cache 520 contents and varying numbers of drives 510, scheduling involves careful selection of a CD Writer for each job. CD Writer Control 400 selects (416, 418) a CD Writer 500 based on the hardware configuration data stored in Resource Manager's resource files 310. CD Writer Control 400 would send a job to the next available CD Writer 500 of the appropriate type that already has the requested content in its cache 520. For optimal production, as many machines as possible would be processing orders concurrently.

Figure 4:
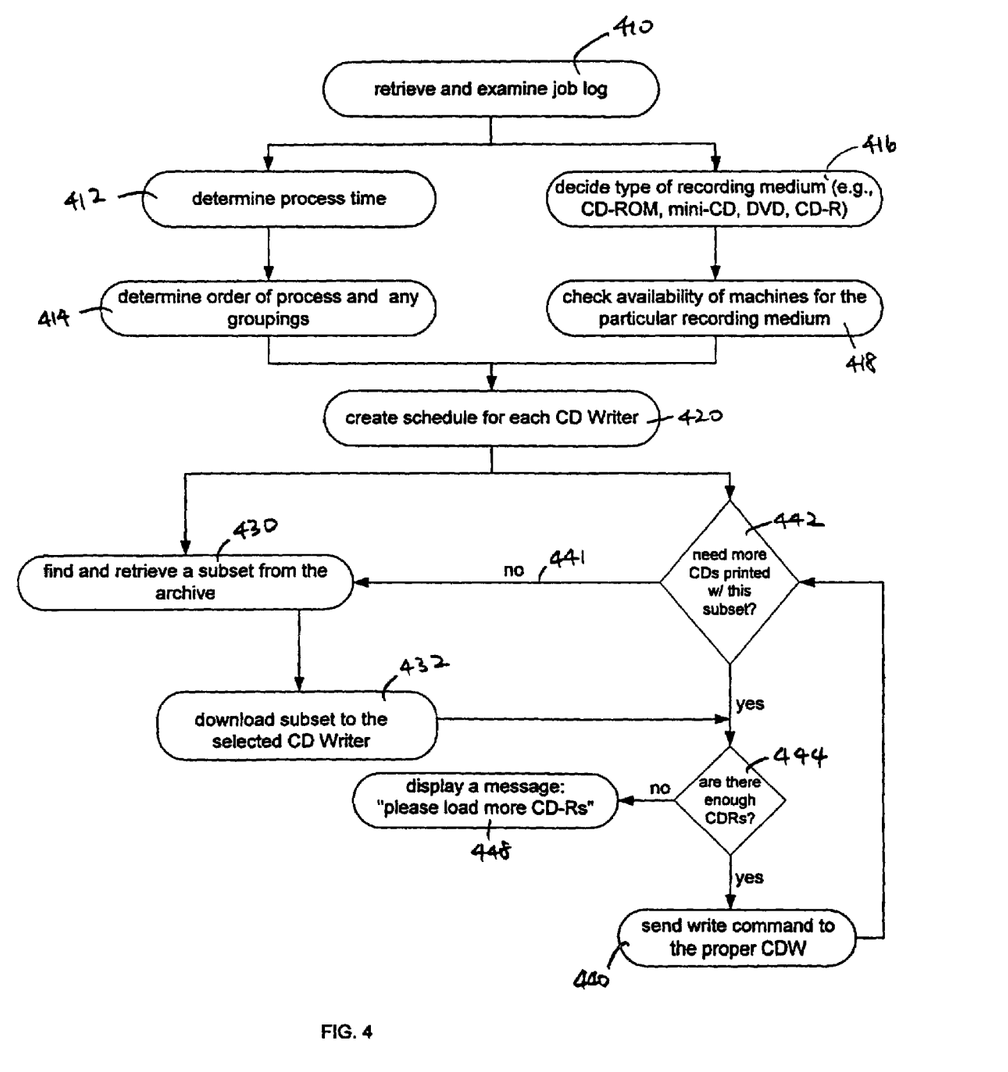
FIG. 4 is a schematic depiction of the functions of CD Writer Control.

Once scheduling is complete, CD Writer Control tells the designated CD Writer to begin the duplication process by sending a "write" command in the appropriate machine language 440. However, before sending the "write" command, CD Writer Control 400 must check to make sure there are enough blank CD-Rs 540 loaded in the particular machine, as shown in FIG. 4. CD-R, as used herein, refers to any kind of medium onto which data can be fixed, printed, embodied, or stored, and from which the information fixed, printed, embodied, or stored therein can be perceived, reproduced, used, or otherwise communicated, either directly or indirectly with the aid of a device. Each CD Writer can be designed to hold as many number of CD-Rs as is practical. If there is an insufficient number of blank CD-Rs remaining, CD Writer Control notifies the operator with a short message 448. If there are enough blank CD-Rs, CD Writer Control will send the write command for the proper number of CDs 440. Note that the maximum number of CDs that can be written and printed with one "write" command is equal to the number of drives in the CD Writer that is processing the order (shown as n in FIG. 4). Thus, CD Writer Control repeatedly sends 446 a "write" command to the designated machine until the requested number of CDs have been produced. When a request is fulfilled, CD Writer Control 400 proceeds to the next request scheduled for the particular CD Writer.

In the event that no CD Writer of the appropriate type contains the requested data in its cache, CD Writer Control must check whether there is enough cache space left in the machine and download 432 the necessary data onto that machine from the Resource Manager internal archive. Only after downloading is complete can the CD Writer Control send its "write" command, which directs the CD Writers to transfer a specific subset of data from their cache to the blank CD-Rs In one embodiment, each CD Writer is designed to hold up to about 200 CD images and printer graphics (depending on the size of the images).

Writing a CD entails not only transferring digital data from the cache 520 to the blank CD-Rs 540, but also printing certain graphics on the surface of the mediums. Thus, each CD Writer must be equipped with at least one printing device 530.

While the present invention is illustrated with particular embodiments, it is not intended that the scope of the invention be limited to the specific and preferred embodiments illustrated and described.

I claim:

1. A computer-implemented method of digital data duplication comprising:
   taking requests at one or more user interfaces;
   transmitting said requests through a network to a computer;
   assigning each of said requests to one of a plurality of output devices; and
   executing the duplication process,
   wherein said computer comprises:
   at least one first module configured to create a task log based on incoming requests;
   at least one second module configured to provide data to be duplicated in said duplication process;
   at least one third module configured to retrieve data for duplication from said second module and download said data for duplication to one of said output devices, and further configured to command said output device to transfer said data for duplication onto media; and
   a connection through which said second module communicates with said first module and a connection through which said second module communicates with said third module.

2. The method of claim 1, wherein said media is selected from the group consisting of: CD disks, DVD disks, HDVD disks, Blu-Ray disks, non-volatile computer memory, flash memory, hard disk drives and floppy disk drives.

3. The method of claim 1, wherein said media is selected from the group consisting of: personal stereo players, laptop computers, and palm top computers.

4. The method of claim 1, wherein said data retrieved by said second module comprises:
   an expandable indexed archive of digital data, said data representing contents available for request by customers; and
   at least one resource file for each of said output devices in communication with said computer.

5. The method of claim 4, wherein said data in each said resource file comprise:
   name and type of said output devices;
   network address of said output device;
   number of drives in said output device;
   availability of said output device;
   number of recording mediums pre-loaded in said output device;
   index of digital data that has been downloaded onto said output device; and
   hard drive capacity remaining in said output device.

6. A system for duplication of data onto digital recording media, the system comprising:
   a customer interface; and
   a communication network connecting said customer interface to a server that schedules and process duplication;
   wherein said server comprises:
   first module for creating a log of customer requests;
   second module for storing the data to be duplicated;
   third module for scheduling the duplication of each request and directing each request to one of a plurality of output devices;
   at least one printing device for producing mailing labels for each request; and
   at least one output device for transferring the data requested by customers from an internal data storage onto digital recording media.

7. The system of claim 6, wherein said media is selected from the group consisting of: CD disks, DVD disks, HDVD disks, Blu-Ray disks, non-volatile computer memory, flash memory, hard disk drives and floppy disk drives.

8. The method of claim 6, wherein said media is selected from the group consisting of: personal stereo players, laptop computers, and palm top computers.

9. The method of claim 6, further comprising the step of transferring additional information onto said digital recording media.

10. The system of claim 9, wherein said media is selected from the group consisting of: CD disks, DVD disks, HDVD disks, Blu-Ray disks, non-volatile computer memory, flash memory, hard disk drives and floppy disk drives.

11. The system of claim 9, wherein said media is selected from the group consisting of: personal stereo players, laptop computers, and palm top computers.

12. The system of claim 9, wherein said additional information is selected from the group consisting of: serial number, creation date, copyright notice, owner information, service provider information, advertisement information, and digital rights management information.

13. The system of claim 12, wherein said media is selected from the group consisting of: CD disks, DVD disks, HDVD disks, Blu-Ray disks, non-volatile computer memory, flash memory, hard disk drives and floppy disk drives.

14. The system of claim 12, wherein said media is selected from the group consisting of: personal stereo players, laptop computers, and palm top computers.

* * * * *

UNITED STATES PATENT AND TRADEMARK OFFICE
CERTIFICATE OF CORRECTION

| | | |
|---|---|---|
| PATENT NO. | : 7,392,283 B2 | |
| APPLICATION NO. | : 11/653150 | |
| DATED | : June 24, 2008 | |
| INVENTOR(S) | : Sungil Lee | |

It is certified that error appears in the above-identified patent and that said Letters Patent is hereby corrected as shown below:

Col. 1, Line 6, insert:

-- CROSS REFERENCE TO RELATED APPLICATIONS

This application is a continuation of copending application serial number 09/718,286, filed 11/21/2000 and issued as Patent Number 7,174,362. --

Signed and Sealed this
Second Day of August, 2011

David J. Kappos
*Director of the United States Patent and Trademark Office*

(12) EX PARTE REEXAMINATION CERTIFICATE (10726th)
United States Patent
Lee (10) Number: US 7,392,283 C1
(45) Certificate Issued: *Oct. 2, 2015

(54) METHOD AND SYSTEM FOR SUPPLYING PRODUCTS FROM PRE-STORED DIGITAL DATA IN RESPONSE TO DEMANDS TRANSMITTED VIA COMPUTER NETWORK

(75) Inventor: Sungil Lee, San Jose, CA (US)

(73) Assignee: INNOVATIVE AUTOMATION LLC, Glendale, CA (US)

Reexamination Request:
No. 90/012,129, Feb. 14, 2012

Reexamination Certificate for:
Patent No.: 7,392,283
Issued: Jun. 24, 2008
Appl. No.: 11/653,150
Filed: Jan. 11, 2007

Certificate of Correction issued Aug. 2, 2011

( * ) Notice: This patent is subject to a terminal disclaimer.

Related U.S. Application Data

(63) Continuation of application No. 09/718,286, filed on Nov. 21, 2000, now Pat. No. 7,174,362.

(51) Int. Cl.
*G06F 15/16* (2006.01)
*H04L 29/08* (2006.01)

(52) U.S. Cl.
CPC .............................. *H04L 29/08081* (2013.01)

(58) Field of Classification Search
CPC ................................................ H04L 29/08081

USPC .......................................................... 709/203
See application file for complete search history.

(56) References Cited

To view the complete listing of prior art documents cited during the proceeding for Reexamination Control Number 90/012,129, please refer to the USPTO's public Patent Application Information Retrieval (PAIR) system under the Display References tab.

*Primary Examiner* — Michelle Tarae (57) ABSTRACT

The present invention relates to a digital data duplication system that utilizes one or more computer networks to automate the process from order-taking to delivery, eliminating the need for human supervision. Customers enter requests for a given number of machine-readable articles containing digital data, typically compact disks. The requests are transferred to a website, which sends to a server electronic mails containing the details of the requests. Upon receiving an electronic mail, the server directs a printing device to produce mailing labels for shipment. The server has an internal archive of all data it uses to convert blank CD-Rs into the requested CDs, and is connected to a series of CD-R writing machines. The server schedules each request, downloads necessary data onto the CD-R writing machine that is assigned a particular request, and sends a write command. The CD-R writing machine subsequently transfers the data in its cache onto the pre-loaded CD-Rs. After the data transfer is complete, the CDs embodying the requested information are automatically placed in a bin for shipment.

EX PARTE
REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-14 are cancelled.

\* \* \* \* \*